(12) United States Patent
Krysztof et al.

(10) Patent No.: US 8,523,737 B1
(45) Date of Patent: Sep. 3, 2013

(54) ALL-WHEEL-DRIVE DISCONNECT CLUTCH CONTROL

(75) Inventors: Charles E. Krysztof, Canton, MI (US);
Jacob M. Povirk, Franklin, MI (US);
Kevin M. Sullivan, Clinton Township, MI (US); Wayne B. Uhrick, Macomb, MI (US); Charles G. Hartinger, Brighton, MI (US); Thomas E. Gochenour, Waterford, MI (US);
Andreas E. Perakes, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/546,100

(22) Filed: Jul. 11, 2012

(51) Int. Cl.
*B60W 10/02* (2006.01)
*B60W 10/04* (2006.01)
*F16H 59/00* (2006.01)

(52) U.S. Cl.
USPC ................ 477/35; 477/98; 477/180

(58) Field of Classification Search
USPC .............................. 477/35, 98, 180
See application file for complete search history.

(56) References Cited

U.S. PATENT DOCUMENTS

| 2,789,447 | A * | 4/1957 | Cabell | 477/35 |
| 7,753,173 | B2 * | 7/2010 | Gratzer et al. | 184/6.12 |
| 8,439,800 | B1 * | 5/2013 | Bazan et al. | 477/77 |

* cited by examiner

*Primary Examiner* — Edwin A Young
(74) *Attorney, Agent, or Firm* — James Dottavio; MacMillan, Sobanski & Todd, LLC

(57) ABSTRACT

A method for controlling a vehicle drivetrain includes de-energizing a clutch that connects a differential output to a wheel, rotating said component through a sump by pulsing the clutch when a speed of a differential component is less than a reference speed, and cyclically pulsing the clutch while a speed of said component exceeds the reference speed and a count of a timer, started when the clutch is de-energized, exceeds a reference count.

16 Claims, 4 Drawing Sheets

ALL-WHEEL-DRIVE DISCONNECT CLUTCH CONTROL

BACKGROUND OF THE INVENTION

1. Field of the Invention

This invention relates generally to protecting components of a motor vehicle's all-wheel-drive (AWD) system, particularly its differential and halfshafts, when operating with its disconnect clutch de-engergized.

2. Description of the Prior Art

When an AWD drivetrain operates in disconnect mode, the hypoid ring and pinion gears and one of the output shafts of the Rear Drive Unit (RDU) are disconnected from the drivetrain by low-drag torque clutches, thereby preventing transmission of rotary motion and torque from the engine and vehicle wheels to the hypoid ring and pinion gears and driveshaft. A first RDU output shaft, which is connected to its respective differential side gear, rotates at a speed corresponding to vehicle speed. A second RDU output shaft, which is disconnected from the drivetrain, rotates at the same speed as that of the first output shaft but in the opposite direction. The relative speed across the differential assembly, which is referred to as differential speed, is two times the rotational speed of the first output shaft.

A purpose of an AWD disconnect system is to minimize parasitic losses of the AWD system when not engaged, thus significantly improving fuel economy during most driving conditions. When in AWD disconnect mode, the differential speed at maximum vehicle speed can be extremely high. If the hypoid ring and pinion gears are stationary, the differential housing does not rotate. Therefore, the differential pinions contained within the differential housing, which rotate at high differential speeds, can remain above the sump oil level for an extended period of time. This condition reduces ability to reject heat.

The previous solutions involved the addition of special surface treatments, extra parts such as bearings, and more elaborate lubrication methods, all of which increase the cost of the RDU. A need exists for a technique to prevent damage to the RDU differential and output shafts due to inadequate heat rejection at the interfaces experiencing high relative speed while in AWD disconnect mode.

SUMMARY OF THE INVENTION

A method for controlling a vehicle drivetrain includes de-energizing a clutch that connects a differential output to a wheel, rotating a differential component through a sump by pulsing the clutch when a speed of said differential component is less than a reference speed, and cyclically pulsing the clutch while a speed of said component exceeds the reference speed and a count of a timer, started when the clutch is de-energized, exceeds a reference count.

The method minimizes parasitic losses while protecting the hardware by pulsing the clutch as a function of AWD state, vehicle speed and RDU fluid sump temperature to reduce differential speed and rotate the differential housing to prevent damage to the hardware, without objectionable noise.

The method uses a calibrated frequency of clutch pulses to rotate the differential housing to ensure that the structural limitations of the hardware are not exceeded. This enables the differential pinions to rotate and to sweep through the lubrication sump at a predetermined frequency. The frequency and duration of the clutch pulses are optimized to protect the hardware with minimal parasitic losses.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
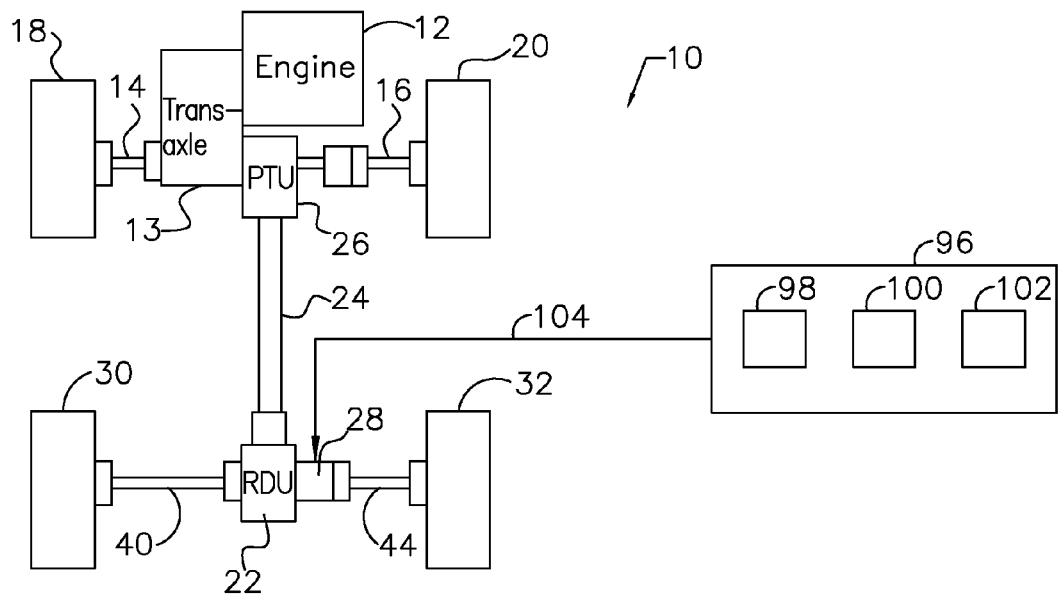
FIG. 1 is a schematic diagram showing an AWD powertrain and a related control system.
Figure 2A:
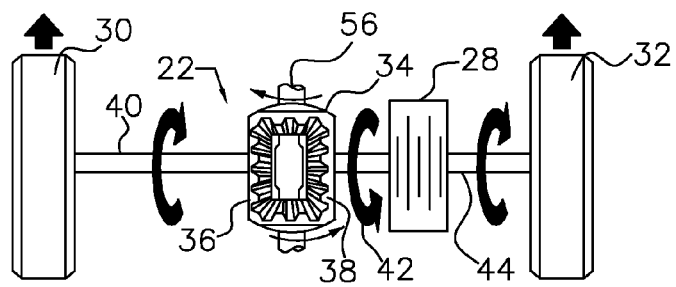
FIGS. 2A and 2B are schematic diagrams showing a RDU differential with AWD disconnected and connected, respectively.
Figure 2B:
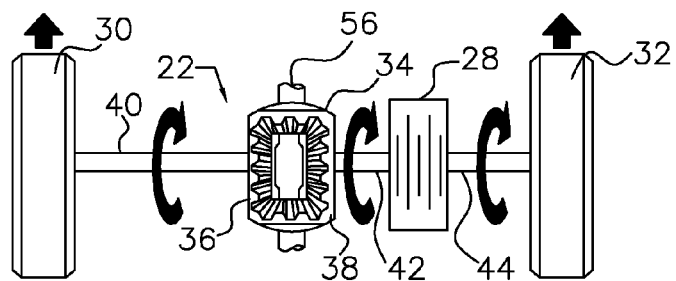

Referring to FIGS. 1, 2A and 2B, the powertrain 10 of a motor vehicle includes an engine 12, such as an internal combustion engine; a transaxle 13 for producing multiple forward drive speed ratios and reverse drive; halfshafts 14, 16 for transmitting rotating power between the transaxle's output and the front driven wheels 18, 20; an RDU 22; a driveshaft 24; a power take-off unit (PTU) 26 for transmitting rotating power between the transaxle's output and the driveshaft; and an AWD clutch 28 for alternately driveably connecting and disconnecting the output of the RDU and the rear driven wheels 30, 32.

The RDU 22 includes a differential assembly 34, which includes a differential side gear 36, connected by a shaft 40 to wheel 30, and a differential side gear 38, connected by a shaft 42 to an AWD clutch 28. Shaft 44 connects rear wheel 32 to the output of AWD clutch 28.

FIG. 2B shows the AWD powertrain 10 in connect mode, wherein the AWD clutch 28 is energized, thereby transmitting power from the RDU 22 to the rear wheels 30, 32. FIG. 2A shows the AWD powertrain 10 in disconnect mode, wherein the AWD clutch 28 is de-energized, whereby shaft 42 rotates opposite the rotary direction of shaft 40 and at the same speed.

Figure 3:
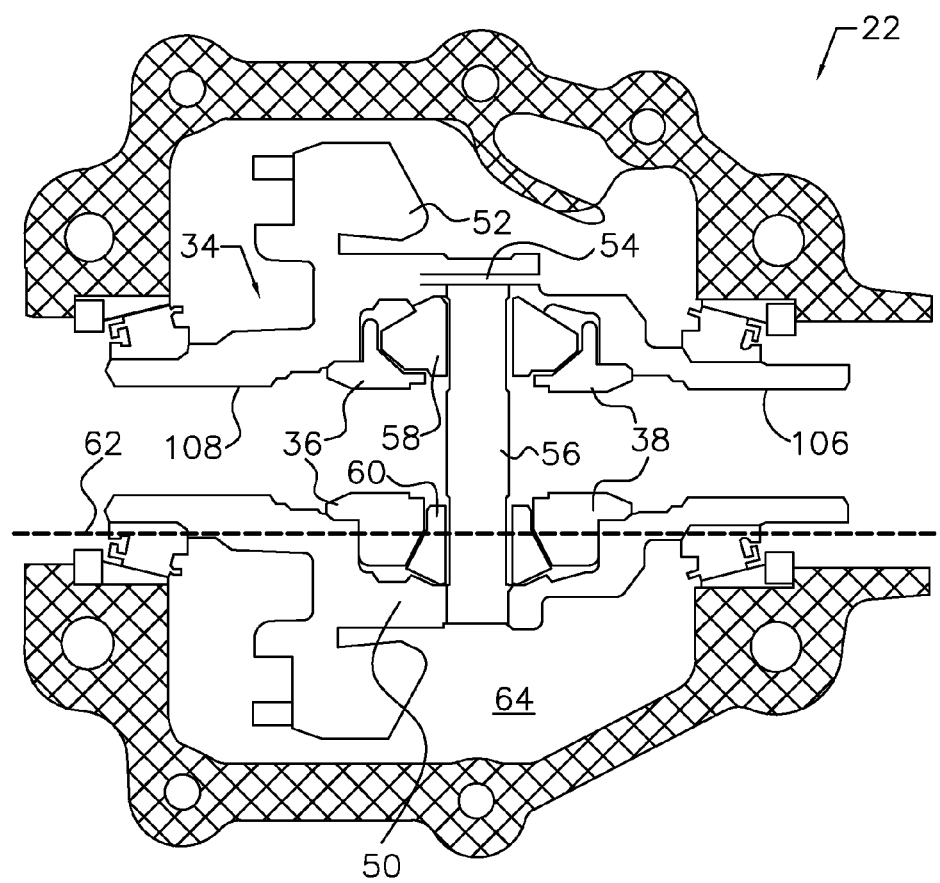
FIG. 3 is a cross-sectional view of the RDU showing the elevation of gears of the differential relative to a level of lubricant in a sump.

FIG. 3 is a cross section taken at a diametric plane through the RDU housing showing the differential mechanism 34, which includes a ring gear 52, connected to differential housing 50 and connected by a pin 54 to a differential shaft 56, which revolves about a lateral axis substantially parallel to the axis of the shafts 40, 42, 44; differential pinions 58, 60, which revolve with the differential shaft and are supported on the differential shaft to rotate about the axis of the differential shaft; and differential side gears 36, 38, which mesh continually with the differential pinions 58, 60.

When ring gear 52 and differential housing 50 are stationary, line 62 represents the upper surface of hydraulic lubricant in the sump 64 of the housing.

The RDU's ring gear 52 may not rotate at all when the powertrain 10 is in AWD disconnect mode due to clutch 28 being a low drag clutch. Therefore, the differential pinions 58, 60 can remain above the oil sump level for an extended period or indefinitely if the ring gear 52 is stationary.

Figure 4:
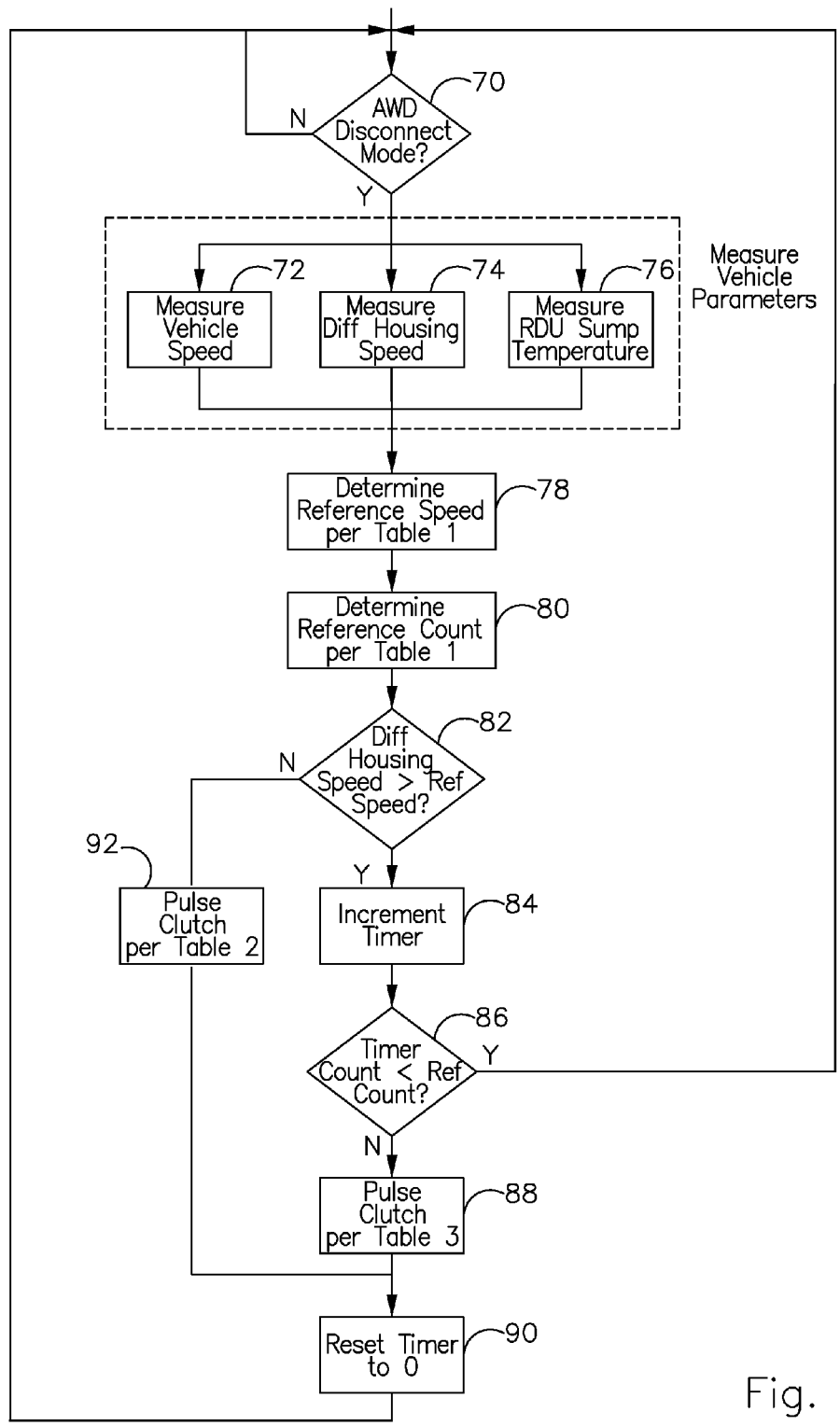
FIG. 4 is a logic flow diagram for controlling the AWD clutch.

Referring to the logic flow diagram of FIG. 4, at step 70 a test is made to determine whether the AWD system is operating in Connect Mode or Disconnect Mode. If the result of test 70 is logically false, step 70 is re-executed. If the result of test 70 is logically true, vehicle parameters are determined, preferably by measurement. At step 72 the speed of vehicle 10 is determined, either measured or inferred; at step 74 the speed of differential housing 50 is determined, either measured or inferred; at step 76 the temperature of the RDU sump 64 is determined, either measured or inferred.

At step 78 the reference speed of differential housing 50 is determined, preferably from a look-up table similar to Table 1, as a function of vehicle speed and the temperature of the RDU sump 64.

Similarly at step 80 the number of revolutions of housing 50 that occur after the disconnect mode is entered and its entry is verified at step 70 is determined as a function of vehicle speed the temperature of the RDU sump 64, preferably from a look-up table similar to Table 1. Housing 50 may rotate slowly due to clutch drag even during AWD disconnect mode.

TABLE 1

| Vehicle Speed (mph) | RDU Sump 64 Temp. (deg C.) | Reference Speed of Housing 50 (rpm) | Reference Count (msec) |
|---|---|---|---|
| xx | xx | xx | xx |

At step 82 a test is made to determine whether the speed of differential housing 50, either measured or inferred, is greater than the reference speed of housing 50 determined in step 78.

If the result of test 82 is logically true, at step 84 a timer is incremented and its count is monitored.

At step 86 a test is made to determine whether the timer, which preferably increases a count of clock pulses following step 84, contains a count of clock pulses that is less than the reference count determined at step 80.

If the result of test 86 is true, indicating that insufficient time has elapsed, control returns to step 70.

If the result of test 86 is false, indicating that sufficient time has elapsed, at step 88 a magnitude of electric current is to be applied to a device that actuates clutch 28 into engagement, and the length of the period during which the current is applied to the device, i.e., its duration, are determined as a function of vehicle speed the temperature of the RDU sump 64, preferably from a look-up table similar to Table 3.

TABLE 2

| Vehicle Speed (mph) | RDU Sump 64 Temp. (deg C.) | Clutch 88 Coil Current (ADC) | Duration (msec) |
|---|---|---|---|
| xx | xx | xx | xx |

An electronic controller 96 includes a microcomputer 98 and electronic memory 100, the microcomputer being accessible to the control algorithm of FIG. 4 expressed in computer-readable coded format. The microcomputer 98 includes a clock or timer 102, which maintains a count of the number of pulses produced by the clock between the time when the count is started and ended. As a result of executing the control algorithm, controller 96 produces output signals 104, which causes pulses of electric current to be applied to the actuation device of clutch 28 for the reference duration during each repetitive execution of the algorithm. The electric current pulses alternately energize and de-energize the clutch 28. When clutch 28 is energized by a current pulse the differential pinions 58, 60 rotate into the oil sump 64 and are lubricated, thereby preventing damage to RDU 22 and the components of the rear differential 34.

At step 90 the timer 102 is reset and control returns to step 70.

If the result of test 82 is false, indicating that the rotational speed of differential housing 50 is relatively low, at step 92 a magnitude of electric current to be applied to a device that actuates clutch 28 into engagement, and the length of the period during which the current is applied to the actuation device, i.e., its duration, are determined as a function of vehicle speed and the temperature of the RDU sump 64, preferably from a look-up table similar to Table 2. Control advances to step 90 after step 92 is executed Although Tables 2 and 3 appear similar, the magnitudes of the electric current to be applied to a device that actuates clutch 28 into engagement and the length of the period may be mutually different.

TABLE 3

| Vehicle Speed (mph) | RDU Sump 64 Temp. (deg C.) | Clutch 88 Coil Current (ADC) | Duration (msec) |
|---|---|---|---|
| xx | xx | xx | xx |

The controller 96 is supplied with electronic signal sensors, whose signals represent wheel speed, housing speed and sump temperature.

The critical interfaces of the driveline 10 that are lubricated due to pulsing clutch 28 include, without limitation, (i) an interface between the central bore of each differential pinion 58, 60 and the spindle 56; (ii) an interface between a thrust face of each differential pinion 58, 60 and a respective thrust washer; (iii) an interface between a thrust face of each differential side gear 36, 38 and a respective thrust washer; (iv) the meshing teeth of differential pinions 58, 60 and side gears 36, 38: and (v) an interface between each output shaft 40, 42 and a respective journal bore 80, 82 in the differential housing 50.

Figure 5:
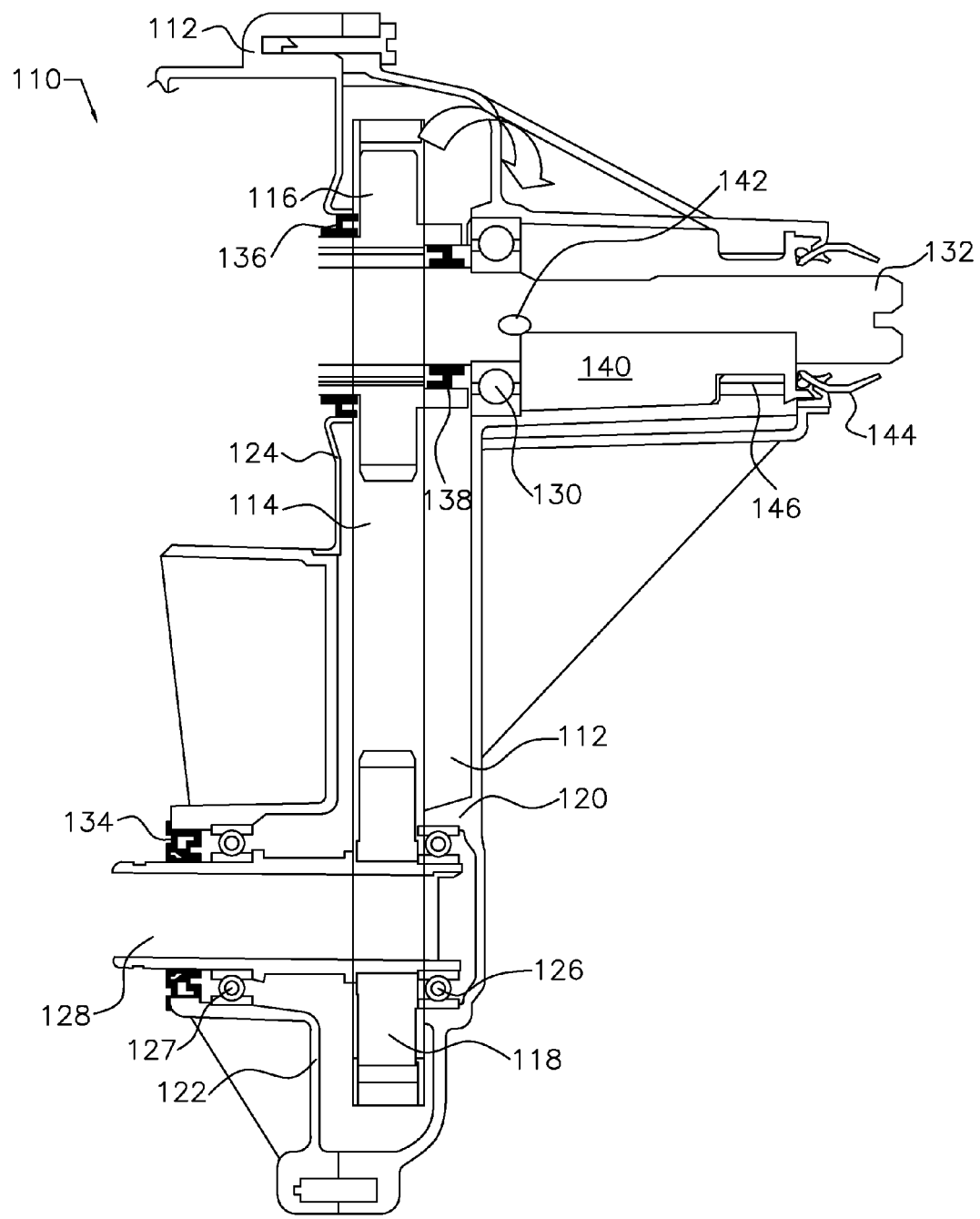
FIG. 5 is a cross section taken through a rear portion of a transfer case.

FIG. 5 is a cross section taken through a rear portion of a transfer case 110, in which a sealed sump chamber 112 contains a drive chain 114 engaged with sprocket wheels 116, 118. Sump chamber 112 is enclosed by a rear casing 120, forward casing 122 and a disc seal 124. Bearings 126, 127 support a driveshaft 128, which transmits rotating power to the front axle shafts of a motor vehicle. A bearing 130 support a driveshaft 132, which transmits rotating power to the rear axle shafts of the vehicle. Seals 134, 136, 138, and 144 seal sump 112 against the flow of lubricant, such as automatic transmission fluid (ATF), from sump chamber 112. The forward side of bearing 130 is sealed against ATF flow from a rear output cavity 140. The upper surface of ATF in cavity 140 is represented by a drain port 142, which limits the flow of ATF from cavity 140 into sump chamber 112.

ATF in rear output cavity 140 lubricates bearing 130, bushing 146, and seal 144. When sprockets 116, 118 rotate, chain 114 moves on the sprockets through the ATF in chamber 112 and slings ATF into the rear output cavity 140. The chain 114, however, remains motionless on the sprockets in certain operating modes of transfer case 110, during which time driveshaft 132 continues to rotate. In order to maintain lubricant on the surfaces of bearing 130, bushing 146, and seal 144, cavity 140 must remain full of lubricant. To replenish lubricant in cavity 140 which may splash out on rough roads or drain out on inclines, the algorithm of FIG. 4 periodically actuates a clutch, which functions similarly to clutch 28, to transmit torque to front driveshaft 132, causing the sprockets 116, 118 to rotate and chain 114 to move through the lubricant in sump chamber 112.

The algorithm of FIG. 4 may rely on road slope (either measured or inferred) and road surface roughness in addition to vehicle speed and temperature of lubricant in chamber 112, when the control strategy for pulsing clutch 28 is applied to a transfer case 110.

In accordance with the provisions of the patent statutes, the preferred embodiment has been described. However, it should be noted that the alternate embodiments can be practiced otherwise than as specifically illustrated and described.

The invention claimed is:

1. A method for controlling a vehicle drivetrain, comprising:
   (a) de-energizing a clutch that connects a component to a vehicle wheel;
   (b) when a speed of the component is less than a reference speed, rotating said component through a sump by pulsing the clutch;
   (c) while a speed of said component exceeds the reference speed and a count of a timer, started when the clutch is de-energized, exceeds a reference count, cyclically pulsing the clutch.

2. The method of claim 1, wherein pulsing the clutch comprises alternately de-energizing and energizing the clutch while the clutch is driveably connected to a source of rotating power.

3. The method of claim 1, wherein step (b) further comprises determining, as a function of vehicle speed and a temperature of lubricant in the sump, a magnitude of electric current to be applied to a device that actuates the clutch and a length of a period during which the electric current is applied to the device.

4. The method of claim 1, wherein step (c) further comprises determining, as a function of vehicle speed and a temperature of lubricant in the sump, a second magnitude of electric current to be applied to a device that actuates the clutch and a second length of a period during which the electric current is applied to the device.

5. The method of claim 1, wherein step (c) further comprises determining the reference count as a function of vehicle speed and a temperature of lubricant in the sump.

6. The method of claim 1, wherein rotating said component through lubricant in the sump provides lubricant to at least one of (i) an interface between a central bore of a pinion of a differential and a shaft of the differential; (ii) an interface between a thrust face of said pinion and a respective thrust washer; (iii) an interface between a thrust face of a side gear of the differential and a respective thrust washer; (iv) meshing teeth of said pinion and side gear: and (v) an interface between an output shaft of the differential and a journal bore in a housing of the differential.

7. The method of claim 1, wherein step (a) further comprises de-energizing a clutch that connects one of an output of a differential and a drive chain of a transfer case for a motor vehicle to a vehicle wheel.

8. A method for controlling a vehicle drivetrain, comprising:
   (a)) de-energizing a clutch that connects a source of rotating power through a differential to a wheel;
   (b) determining a reference speed and a reference count;
   (c) when a speed of a differential component is less than the reference speed, rotating said component through a sump by pulsing the clutch;
   (d) while a speed of said component exceeds the reference speed and the count of a timer, started when the clutch is de-energized, exceeds the reference count, pulsing the clutch.

9. The method of claim 8, wherein pulsing the clutch comprises alternately de-energizing and energizing the clutch while the clutch is driveably connected to the power source.

10. The method of claim 8, wherein step (b) further comprises determining the reference speed and the reference count as a function of vehicle speed and a temperature of lubricant in the sump.

11. The method of claim 8, wherein step (c) further comprises determining, as a function of vehicle speed and a temperature of lubricant in the sump, a magnitude of electric current to be applied to a device that actuates the clutch and a length of a period during which the electric current is applied to the device.

12. The method of claim 8, wherein step (d) further comprises determining, as a function of vehicle speed and a temperature of lubricant in the sump, a second magnitude of electric current to be applied to a device that actuates the clutch and a second length of a period during which the electric current is applied to the device.

13. The method of claim 8, wherein rotating said component through lubricant in the sump provides lubricant to at least one of (i) an interface between a central bore of a pinion of the differential and a shaft of the differential; (ii) an interface between a thrust face of said pinion and a respective thrust washer; (iii) an interface between a thrust face of a side gear of the differential and a respective thrust washer; (iv) meshing teeth of said pinion and side gear: and (v) an interface between an output shaft of the differential and a journal bore in a housing of the differential.

14. A vehicle drivetrain, comprising:
   a source of rotating power;
   output shafts;
   a differential for transmitting rotating power between the source of rotating power and the output shafts;
   a clutch for alternately de-energizing and energizing a drive connection between the output shaft and a vehicle wheel;
   a controller configured to rotate a differential component through a sump containing lubricant by pulsing the clutch when the clutch is de-energized and a speed of the differential is less than a reference speed, and cyclically pulsing the clutch while a speed of said component exceeds the reference speed and a count of a timer, started after the clutch is de-energized, exceeds a reference count.

15. A vehicle drivetrain, comprising:
   a source of rotating power;
   a shaft for transmitting rotating power from the source of rotating power;
   a clutch for alternately de-energizing and energizing a drive connection between the shaft and a vehicle wheel;
   a controller configured to rotate a component through a sump containing lubricant by pulsing the clutch when the clutch is de-energized and a speed of the component is less than a reference speed, and to cyclically rotate the component through the sump by pulsing the clutch while a speed of said component exceeds the reference speed and a count of a timer, started after the clutch is de-energized, exceeds a reference count.

16. The vehicle drivetrain of claim 15, wherein the component is one of a component of a differential for a motor vehicle and a drive chain of a transfer case for a motor vehicle.

* * * * *